UNITED STATES PATENT OFFICE.

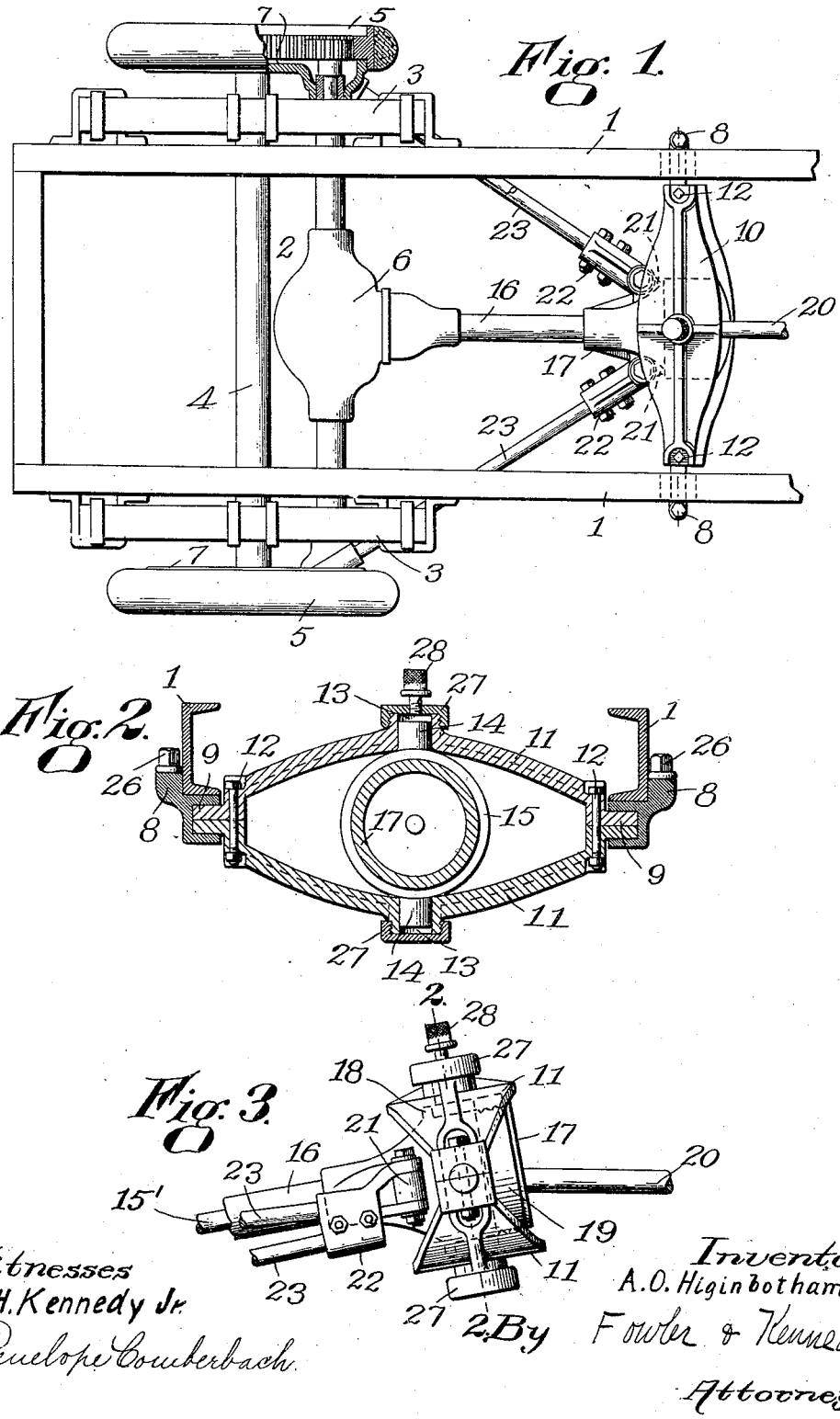

ARTHUR O. HIGINBOTHAM, OF WORCESTER, MASSACHUSETTS, ASSIGNOR TO CHARLES B. FOSTER AND COMPANY, A COPARTNERSHIP, OF WORCESTER, MASSACHUSETTS, AND CONSISTING OF CHARLES B. FOSTER, ARTHUR O. HIGINBOTHAM, AND JEROME R. GEORGE.

MOTOR-VEHICLE.

1,265,912.      Specification of Letters Patent.      Patented May 14, 1918.

Application filed August 6, 1914. Serial No. 855,523.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Motor-Vehicles, of which the following, taken in connection with the accompanying drawings, is a specification.

The present invention relates to motor vehicles, and in particular to the means for supporting or suspending the driving gear of such vehicles, and for transmitting the driving force of the driving wheels to the frame or body of the vehicle.

In motor vehicle practice, by reason of the non-rigid connection of the driving wheels and their supporting gear to the frame of the vehicle, it has become general to provide some connecting means between said supporting gear and said frame, through which the impelling force of the wheels, in either direction, is exerted. Various types of radius rods, or torque rods, as such connecting members are usually called, have been designed, with a view to securing an efficient driving connection, and at the same time permitting sufficient relative movement between the frame and the drive wheels to allow the latter to adjust themselves to inequalities in the road surface.

In actual service, the drive wheels of a motor vehicle, and the supporting means therefor, constituting the "rear system" of the vehicle, must be allowed a considerable range of bodily vertical movement both toward and away from the frame of the vehicle; furthermore, provision must be made for the tilting movement of said rear system, as when one wheel is caused to dispose itself at a higher or lower level than the level of the other wheel, and finally the rotation or angular deflection of said rear system, usually very slight, with respect to the frame, must be compensated for in an effective manner. The present invention aims to provide a cheap and simple construction capable of insuring the above recited conditions of operation, and the details of the same are fully set forth in the following description, and pointed out in the claim annexed thereto, reference being had to the accompanying drawings, in which—

Figure 1 is a fragmentary top plan view, partly in section, of a motor vehicle chassis, having my invention applied thereto.

Fig. 2 is a section on line 2—2, Fig. 3.

Fig. 3 is a side view of a portion of the mechanism shown in Fig. 1.

Like reference characters refer to like parts throughout the different figures.

In the drawings, 1, 1, designate the longitudinal side members of the frame of a motor vehicle, the same being supported by the "rear system" of the vehicle, designated as a whole by the numeral 2, through the medium of the usual springs 3.

In the present instance, I have shown said rear system 2 as comprising a "dead" axle 4, on which the drive wheels 5 are journaled, and a differential casing 6, disposed forwardly of said axle 4, and containing gearing by means of which the power of the prime mover of the vehicle, not shown, is transmitted to drive said wheels 5, as for instance by pinions driven from said gearing and meshing with internal gears secured to each of said wheels. The arrangement above referred to and illustrated is set forth and described in my co-pending application, Serial Number 855,841, filed August 8, 1914, for a motor vehicle; for the purposes of the present invention it is sufficient to state that said differential casing 6 is supported by and rigidly connected at each end to spiders or plates 7, which are in turn rigid with the dead axle 4. Furthermore, it will be clear from the following detailed description that my invention is not to be limited to a rear system of the above described or any other particular construction, since it will be obvious that the drive wheels 5 might equally well be journaled on the ends of said casing 6, as in the ordinary pleasure vehicle practice, or supported in any other well known manner.

Each frame member 1 has rigidly secured thereto a hanger 8, said hangers being disposed opposite one another, and forwardly of said rear system. Said hangers 8 are formed with sockets which are adapted to receive trunnions 9, 9, on the ends of a substantially horizontal member 10 extending transversely of the framework of the vehicle. Said member 10 comprises a pair of reversely arched sections 11, 11, meeting at their ends to form said trunnions, and spaced apart intermediate said ends, said sections being rigidly secured together by bolts 12, 12, to form a substantially integral structure for the member 10.

The sections 11, 11, are provided with alined centrally disposed openings 13, 13, therethrough, and said openings are adapted to receive trunnions 14, 14, formed on diametrically opposite portions of a ring 15 carried within said member 10 and normally disposed in a plane which cuts the vehicle frame transversely. The axis of the trunnions 9, 9, intersects the axis of the trunnions 14, 14.

The tail or propeller shaft 15' of the vehicle enters the differential casing 6, the same being formed with a forwardly extending rigid tubular portion 16 which incloses said shaft and is inclined upwardly toward the member 10. The forward end of said tubular portion 16 has rigidly secured thereon a hollow enlargement or housing 17, the end of which is received within and supported by said ring 15, and is of such a diameter as to have a running fit in said ring. An annular shoulder 18, formed on said housing, is opposed to the rear face of said ring; the extremity of said housing projects beyond the front face of said ring and is threaded to receive a nut 19 which is screwed up against said ring to prevent longitudinal movement of said housing through said ring.

The housing 17 incloses one or more universal joints of any ordinary construction, between the transmission shaft 20 and the said propeller or tail shaft 15' inclosed within said tubular portion 16.

Said housing 17 has a pair of lateral ears 21, to which are bolted, or otherwise secured the brackets 22, diverging rearwardly from the axial line of said housing. Each bracket 22 receives the ends of a pair of radius rods 23, and the rods of each pair diverge rearwardly and are connected at their outer ends to vertically spaced apart bosses 25 above and below the ends of casing 6, formed on the spider or plate 7, which is disposed on that side of the vehicle corresponding to said pair of rods.

By the above construction, the spiders or plates 7, axle 4, casing 6, tubular portion 16, housing 17 and radius rods 23 are connected together in a rigid and unitary structure, of ample strength to withstand the strains incidental to the transmission of the driving force therethrough to the frame or body of the vehicle. Such structure incloses and supports the driving gear of the vehicle and forms in effect a three-point suspension therefor, by reason of the support accorded by the two points of road contact of the wheels 5, 5, and the single point support of the housing 17 in the member 10.

Vertical movement of the wheel 5, 5, toward and away from the vehicle frame is permitted to take place, the member 10 swinging bodily with respect to the frame by reason of its pivotal connection thereto through the trunnions 9, 9. Also the entire rigid structure above set forth can tilt bodily when one wheel drops below the level of the other, because the housing 17 can turn freely in the ring 15. Likewise, any sidewise deflection of said structure can be compensated for without undue strain because of the pivotal mounting of the ring 15 in the member 10. It will be clear also that not only does the structure adapt itself to the conditions of vehicle travel as above described, by movement in three directions, but also to any conditions necessitating a simultaneous movement in any two or more of said directions. The gearing contained within the casing 6 and the driving means for the wheels 5, 5, is thereby always maintained in perfect mesh and alinement, irrespective of what position the unitary structure above described assumes, and irrespective of any distortion or deflection of the frame of the vehicle.

Lubrication of the trunnions 9, 9, is provided for in the usual manner, by grease cups 26, 26, or the like, carried by the hangers 8, 8. The trunnions 14, 14, are inclosed by caps 27, 27, secured on the sections 11, 11 of member 10, and provided with grease cups 28 or the like, which lubricate the bearing surfaces of said trunnions and the bearing surface between the ring 15 and housing 17.

The center line of said ring 15 and housing 17 passes through the point of intersection of the axes of trunnions 9, 9, and 14, 14, so that the support of the forward end of the unitary structure above referred to is concentrated at a single point. Said structure is capable of movement in any or all of three directions with respect to said point, which latter is fixed relative to the frame or chassis of the vehicle. The securing of said structure to the frame of the vehicle, as shown and described, relieves the transmission casing, not shown, of the thrust or pull, as the case may be, exerted through said structure.

In the present construction, it is to be noted, the differential housing or casing 6 is not directly secured to the rigid dead axle 4 at any point, but is simply maintained in parallelism therewith at its ends by its attachment to the spiders or plates 7. As a consequence, the driving strains exerted on said axle are not communicated to said casing in such a manner as to produce any torsional effect thereon, it being clear that the reception of the tubular ends of the casing in the plates 7 provides a connection therebetween which affords the slight play necessary between the axle and casing to prevent the transmission of said strains. As a result the mesh of the driving pinion on the end of shaft 15' with the large gear of the differential, not shown, is never disturbed.

I claim:

In a motor vehicle, the combination with the driving wheels thereof, of means for transmitting the impelling force of said wheels to the frame of the vehicle, a member pivotally connected to said frame for movement about an axis transverse to said frame, and a second member pivotally connected to said first member for movement about an axis substantially perpendicular to the plane of said frame, said transmitting means having a pivotal connection with said second member for movement about an axis extending longitudinally of said frame.

Dated this thirtieth day of July, 1914.

ARTHUR O. HIGINBOTHAM.

Witness:
PENLOPE COMBERBACH.

Copies of this patent may be obtained for five cents each, by addressing the "Commissioner of Patents, Washington, D. C."